United States Patent
Johnson et al.

(10) Patent No.: US 7,155,569 B2
(45) Date of Patent: Dec. 26, 2006

(54) METHOD FOR RAID STRIPED I/O REQUEST GENERATION USING A SHARED SCATTER GATHER LIST

(75) Inventors: Stephen B. Johnson, Colorado Springs, CO (US); Brad D. Besmer, Colorado Springs, CO (US)

(73) Assignee: LSI Logic Corporation, Milpitas, CA (US)

( * ) Notice: Subject to any disclaimer, the term of this patent is extended or adjusted under 35 U.S.C. 154(b) by 571 days.

(21) Appl. No.: 10/184,667

(22) Filed: Jun. 28, 2002

(65) Prior Publication Data

US 2003/0033477 A1    Feb. 13, 2003

Related U.S. Application Data

(63) Continuation-in-part of application No. 09/795,825, filed on Feb. 28, 2001, now abandoned.

(51) Int. Cl.
*G06F 13/14* (2006.01)

(52) U.S. Cl. .......................................... 711/114; 710/5

(58) Field of Classification Search ................ 711/4, 711/111–112, 114, 154; 714/6; 710/5, 36
See application file for complete search history.

(56) References Cited

U.S. PATENT DOCUMENTS

| | | | |
|---|---|---|---|
| 5,619,723 A | * | 4/1997 | Jones et al. ..................... 710/3 |
| 5,909,516 A | * | 6/1999 | Lubin ........................ 382/260 |
| 6,021,462 A | * | 2/2000 | Minow et al. .............. 711/114 |
| 6,381,674 B1 | * | 4/2002 | DeKoning et al. .......... 711/113 |
| 6,591,310 B1 | * | 7/2003 | Johnson ........................ 710/3 |
| 6,591,339 B1 | | 7/2003 | Horst et al. |
| 6,834,326 B1 | * | 12/2004 | Wang et al. ................. 711/114 |

OTHER PUBLICATIONS

"Scatter Gather Lists," Fusion-MPT Message Passing Interface, Chapter III; Copyright © 2001-2002 by LSI Logic Corporation, pp. 3-1 to 3-8.
"IBM Netfinity RAID Technology," © International Business Machines Corporation 1999, pp. 1-15.

* cited by examiner

*Primary Examiner*—Denise Tran
(74) *Attorney, Agent, or Firm*—Suiter·Swantz PC LLO

(57) ABSTRACT

A code efficient transfer method in response to a single host I/O request generates a single scatter gather list. The disk array controller transforms the single host I/O request into multiple physical I/O requests. Each of these multiple physical I/O requests uses the single scatter gather list to perform the data transfer operation. Each physical I/O request corresponds to the data transfer of one data stripe. The data stripe is an initial or header stripe of about 0.5K or a stripe of at least 64K.

11 Claims, 7 Drawing Sheets

METHOD FOR RAID STRIPED I/O REQUEST GENERATION USING A SHARED SCATTER GATHER LIST

CROSS REFERENCE TO RELATED APPLICATIONS

The present invention is a continuation-in-part of U.S. patent application Ser. No. 09/795,825, entitled "Method and Apparatus for RAID Striped Data Transfer", filed Feb. 28, 2001, now abandoned herein incorporated by reference.

FIELD OF THE INVENTION

The present invention generally relates to the field of information handling systems including computer systems and related devices using redundant array of independent disks (RAID) data storage systems and, more particularly, to a system and method for RAID striped data transfer.

BACKGROUND OF THE INVENTION

The performance of disk storage systems is limited by the speed of mechanical components that are used for positioning and transferring data. Since RAID storage systems utilize multiple drives, it is possible to improve their performance by using the hardware of all drives in parallel. Drive spanning allows multiple physical disk drives to be logically concatenated into a single logical disk drive. The capacity of the logical drive created via spanning is the capacity of the physical drives times the number of physical drives. A technique called data striping distributes data evenly across the physical drives in such a manner as to maximize input/output (I/O) performance. Striping divides the logical drive into data blocks called stripes, which are then distributed over the physical disk drives. The layout is such that a sequential read of data on the logical drive results in parallel reads to each of the physical drives. This results in improved performance since multiple drives are operating simultaneously.

Striping is used in the implementation of most of the basic, single RAID levels and as a consequence, any multiple RAID levels that employ the single RAID levels.

The simplest RAID level, RAID 0, uses block-level striping without parity. In RAID 0, one file is divided into multiple groups of sectors and striped across multiple disks. Two advantages of RAID 0 include a large logical disk drive through drive spanning and performance acceleration through data striping. The major uses of RAID 0 are in situations where no redundancy is required or where redundancy can be provided through the use of transaction logs that recreate data from the last status recorded in the log. As a result, RAID 0 is often employed by users seeking high performance at low cost. However, the disadvantage of RAID 0 is that it provides no redundancy. If one disk fails, all data is lost and all disks must be reformatted. RAID 0 does not support a hot-spare drive, thus, if one drive fails, all data is lost. For comparison purposes, RAID 0 is regarded as the baseline against which to measure the performance of the other RAID levels.

Another RAID level, RAID enhanced (also known as RAID 1E, Hybrid RAID 1, or RAID 6), combines mirroring with data striping—data is striped across each disk in the array. The first set of stripes includes the data stripes, and the second set of stripes is the mirror (copies) of the first data stripe, but shifted one drive. RAID 1E shares the characteristics of RAID 1 but additionally allows more than two drives, including odd numbers of drives.

When the host operating system sends an I/O request to move data between the disk and its memory, it provides a scatter gather list (SGL) that describes the actual memory regions to move the data to or from. Typically, the memory regions are fragmented and data is scattered to the various regions when data is transferred to host memory space. When memory is retrieved from host memory space and written to a drive, it is gathered from the various memory regions to form scatter gather list. Typically, striping is implemented by taking the Scatter Gather List (SGL) for the transfer data, which provides a description of the location of the data, and formulating a new SGL for the data transfer to each drive. The original operating system host I/O request is divided into several new I/O requests to be sent to each of the stripe disk members and break up the original scatter gather list is divided into several smaller lists (one for each new I/O request). This method requires extra processing and memory resources to parse the original SGL and create new smaller ones dedicated for each of the new I/O requests.

Therefore, it would be desirable to provide a code efficient method of fulfilling a host I/O request that does not require extra processing and extra memory resources.

SUMMARY OF THE INVENTION

Accordingly, the present invention is directed to a more code efficient method for transferring data to and from disk drives.

In a method for processing a single I/O request from a host to a disk array controller, a single scatter gather list is generated according to parameters of the single I/O request. The single host I/O request is transmitted to and received by a disk array controller and is divided into a plurality of physical I/O requests in which each of the plurality of physical I/O requests traverses the same single scatter gather list. By generating a physical I/O request for each physical stripe and sharing the same SGL by the physical I/O requests, processor action is reduced (i.e., fewer physical I/O requests are generated per host I/O request) resulting in lower costs. Drives are also very efficient at storing I/O requests.

The method of the present invention is particularly useful for embedded RAID firmware for SCSI (Small Computer System Interface), FC (Fibre Channel), Serial Advanced Technology Attachment (SATA), Parallel Advanced Technology Attachment (PATA), and Serial Attached Small Computer System Interface (SAS) controllers.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

The method of the present invention generates a single SGL for each host I/O request, processes the host I/O request into multiple physical I/O requests, shares the single SGL from the original request between all the physical I/O requests generated, and transfers data to and from multiple disks in a RAID system. The present invention may be practiced with a variety of Message Passing Technology (MPT) controllers, including Serial Attached Small Computer Systems Interface (SAS), Serial Advanced Technology Attachment (SATA), Parallel Advanced Technology Attachment (PATA), Fibre Channel (FC), Small Computer System Interface (SCSI), and the like. The datapath engine is an essential part of all the MPT controllers. A datapath engine formed of dedicated hardware, software, firmware, or a combination traverses the SGL according to byte address offsets to access the block of bytes corresponding to a physical I/O request. In effect, the datapath engine skips ahead into the SGL an X number of bytes and then moves the bytes starting at that location. The skip ahead value is referred to as the SkipCount. This method may be designed for RAID 0 and RAID 1B (enhanced mirroring) with various stripe sizes. The number of physical I/O requests generated is related to the number of stripes of data on or to be placed on the physical disks for a given host I/O request.

Figure 1:
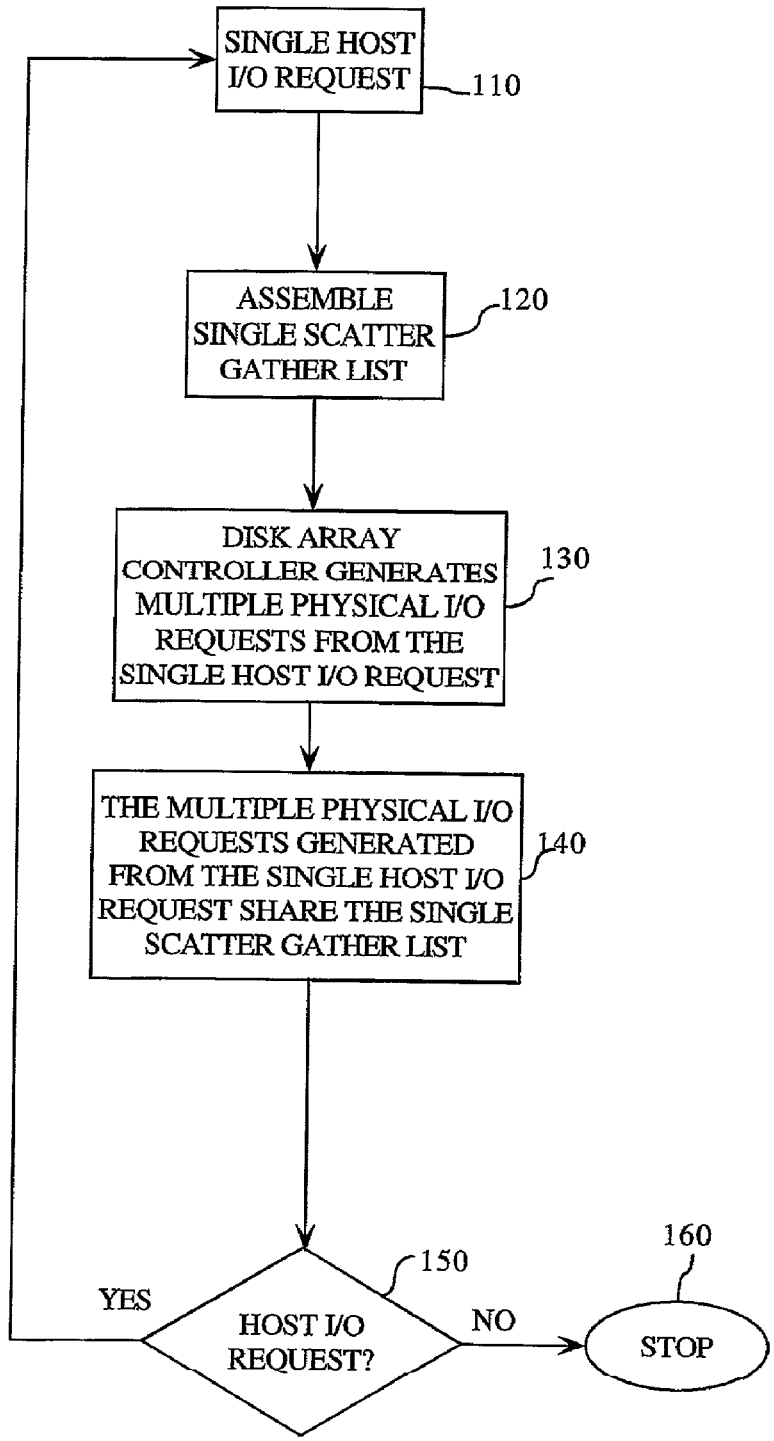
FIG. 1 illustrates the method of the present invention.

FIG. 1 illustrates the method steps of the present invention. The host generates a single I/O request, per step 110. The single host I/O request is transmitted to the data controller. Transmission may be conducted along a bus, through a switching device, by direct cabling, or in a wireless manner. The single host I/O request may be transmitted as parallel or serial data.

The gathered data is assembled as a scatter gather list, as per step 120. One of the types of SGL, the chain SGL, may be useful where the data is located in noncontiguous physical memory. In general, each SGL entry contains an address and a length and may contain flags, such as Size of Address (i.e., 32-bit or 64-bit), End of List Reached, direction of data transfer, and the like. The SGL may be a set of pointers containing address locations which point to the stored bytes and information concerning the stored bytes, a data structure containing an initial address, address offsets, and length or start and stop addresses for each of the initial address and address offsets, and the like.

The single host I/O request is received by the data controller and converted into multiple physical I/O requests, as per step 130. The partition of the single host I/O request into multiple physical I/O requests may be accomplished through several parameters, such as Initial Stripe Size for indicating the size (i.e., the number of bytes) of the initial block of data (e.g., metadata or header information) to be transferred for the first stripe of the drive, an Initial Skip Size for indicating an amount of the drive (i.e., the number of bytes) to skip prior to transferring data for the drive, a Stripe Size for indicating the size (i.e., the number of bytes) in a single stripe, and a Stripe Skip for indicating the amount of the drive to skip after transferring a stripe of data. Alternatively, parameter information may included a set of absolute addresses, each having a start address and an end address, that determine the data that is to be transferred from host memory to the disk drives or determine where data is to be stored when transferred from the disk drives to host memory. As part of the step of generating multiple physical I/O requests, a disk drive is selected. In the case where data is being read from the disk drives, the order of access of the disk drives is predetermined. In the case where data is being written to the disk drives, the order of access may follow a predetermined priority scheme. That is, the data may be written on a space available basis or may be written in a predetermined staggered order across the disk drives. Each physical I/O request corresponds to one data stripe. The data stripes may be of a generally uniform size or may consist of two or more different sizes. A data stripe may be 64K bytes, 1 MB, 0.5K byte (corresponding to a block of 512 bytes), or other appropriate size.

In step 140, the single scatter gather list remains intact during processing. Data for each physical I/O request is extracted as needed. The data extraction per physical I/O request may be performed through hardware, software, and/or firmware. The single scatter gather list may reside in host memory or may be copied to disk array controller memory.

Figure 2:
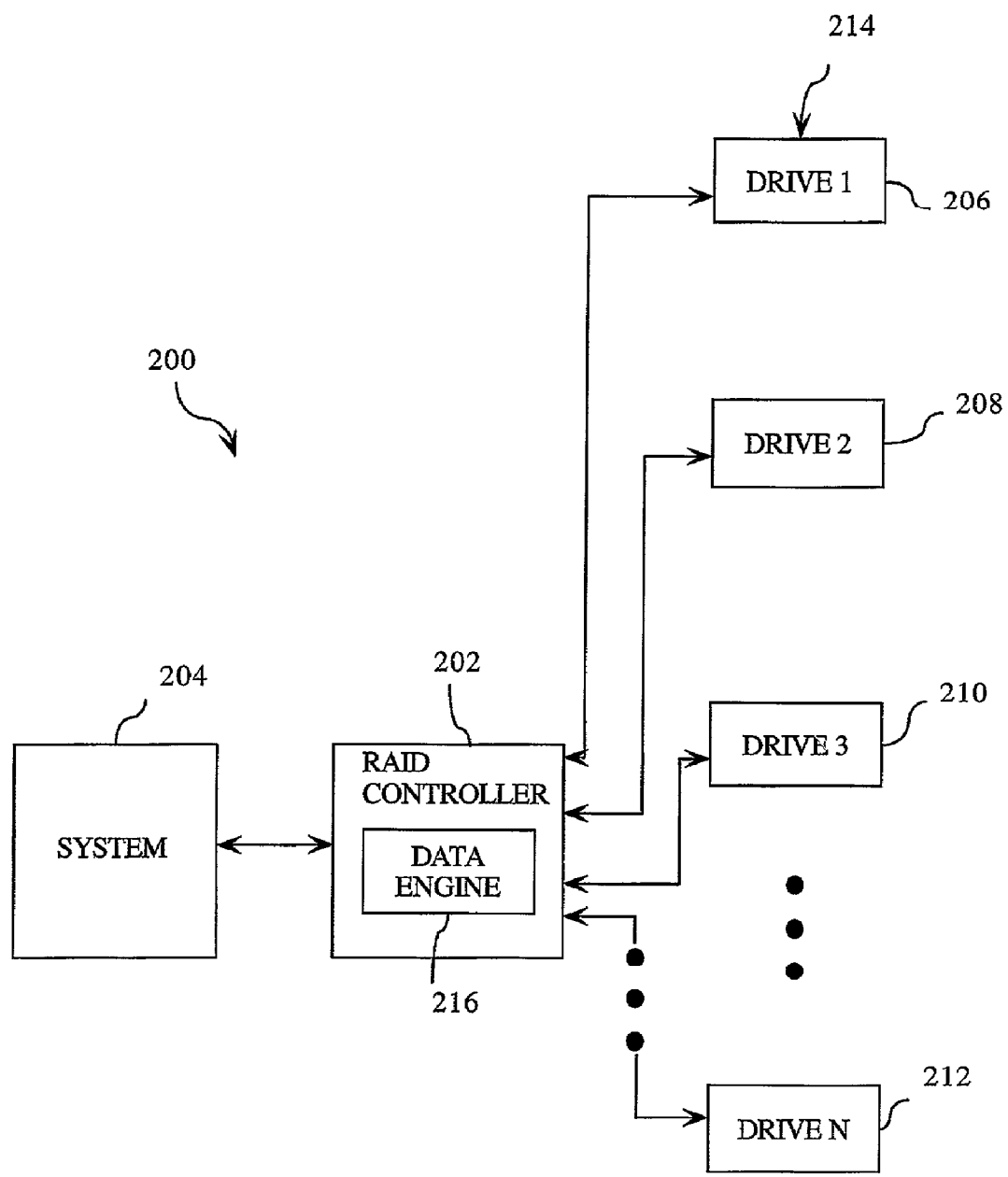
FIG. 2 illustrates a system that employs the method of the present invention.

FIG. 2 illustrates an exemplary RAID system. The system 200 includes a controller, RAID controller 202, for controlling the storage and retrieval of data between computer system 204 and one or more drives 206, 208, 210, and 212 arranged in RAID array 214. In embodiments of the invention, controller 202 may be implemented as either a separate hardware component, or alternately as software (i.e., sets of instructions), executed by a computer system such as computer system 204.

In accordance with the present invention, system 200 further includes a data path engine 216 for splitting data transferred from computer system 204 into blocks that are distributed across two or more drives 206, 208, 210 and 212 within the RAID array 214. In the exemplary embodiment shown in FIG. 2, datapath engine 216 is shown as being implemented as part of controller 202. For instance, in one embodiment of the invention, datapath engine 216 may be implemented as sets of instructions (e.g., software, firmware, and the like) executed by controller 202. Alternately, datapath engine 216 may be implemented separately from controller 202. For instance, datapath engine 216 may be implemented as a separate hardware component wherein controller 202 is implemented as hardware, or a separate software routine, wherein controller 202 is implemented via software. A portion of the datapath engine 216 may be implemented as firmware and a portion may be implemented dynamically through hardware or software for temporary storage of host and physical I/O request parameters.

Datapath engine 216 utilizes the original SGL of the data to be transferred and parameters selected by the operator of the system 200, for determining how data is to be split or striped across two or more of drives 206, 208, 210, and 212. The original SGL may be stored in the host memory and may be transferred to the disk array controller.

Figure 3A:
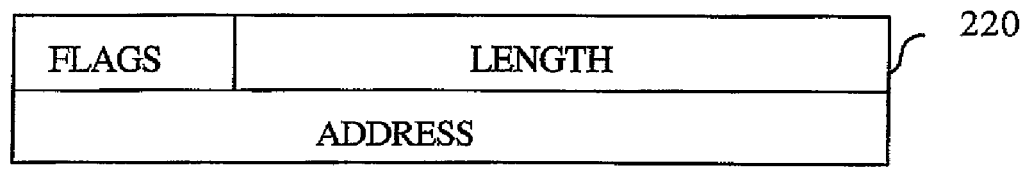
FIGS. 3A and 3B illustrate an SGL entry and SGL, respectively.
Figure 3B:
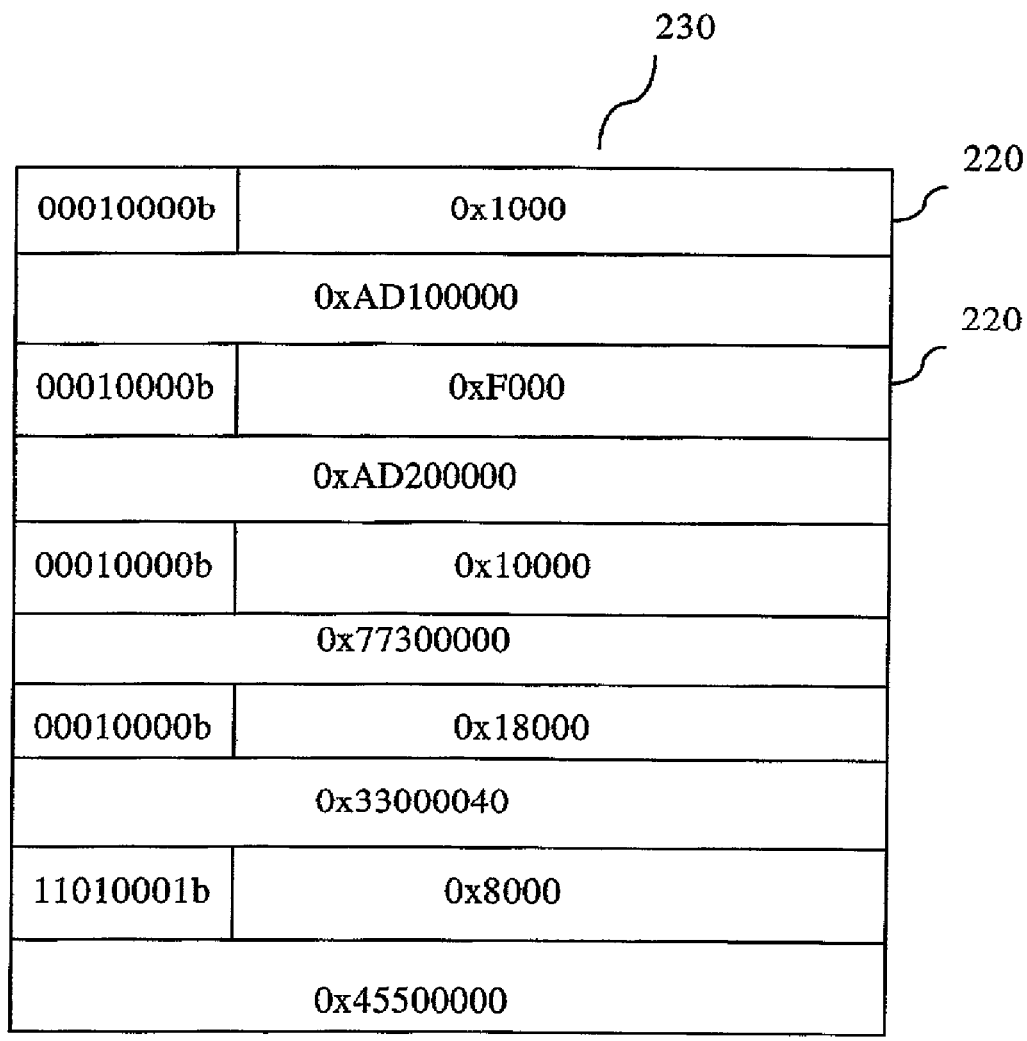

FIGS. 3A and 3B illustrate an SGL list. In FIG. 3A, an SGL entry 220 may contain a flag field. The flag field bits may be dedicated for certain parameter information, such as end of list, address size, direction read/write, local/system address, entry or element type (i.e., simple or chain), end of buffer, and last element. FIG. 3B shows an example of a scatter gather list 230 having five simple element SGL entries 220 that describe a total of 256K bytes.

The present method for transferring stripes of data to and from a host device may be practiced in various ways. For example, several parameters or a single parameter may be used to traverse a single SGL.

Figure 4:
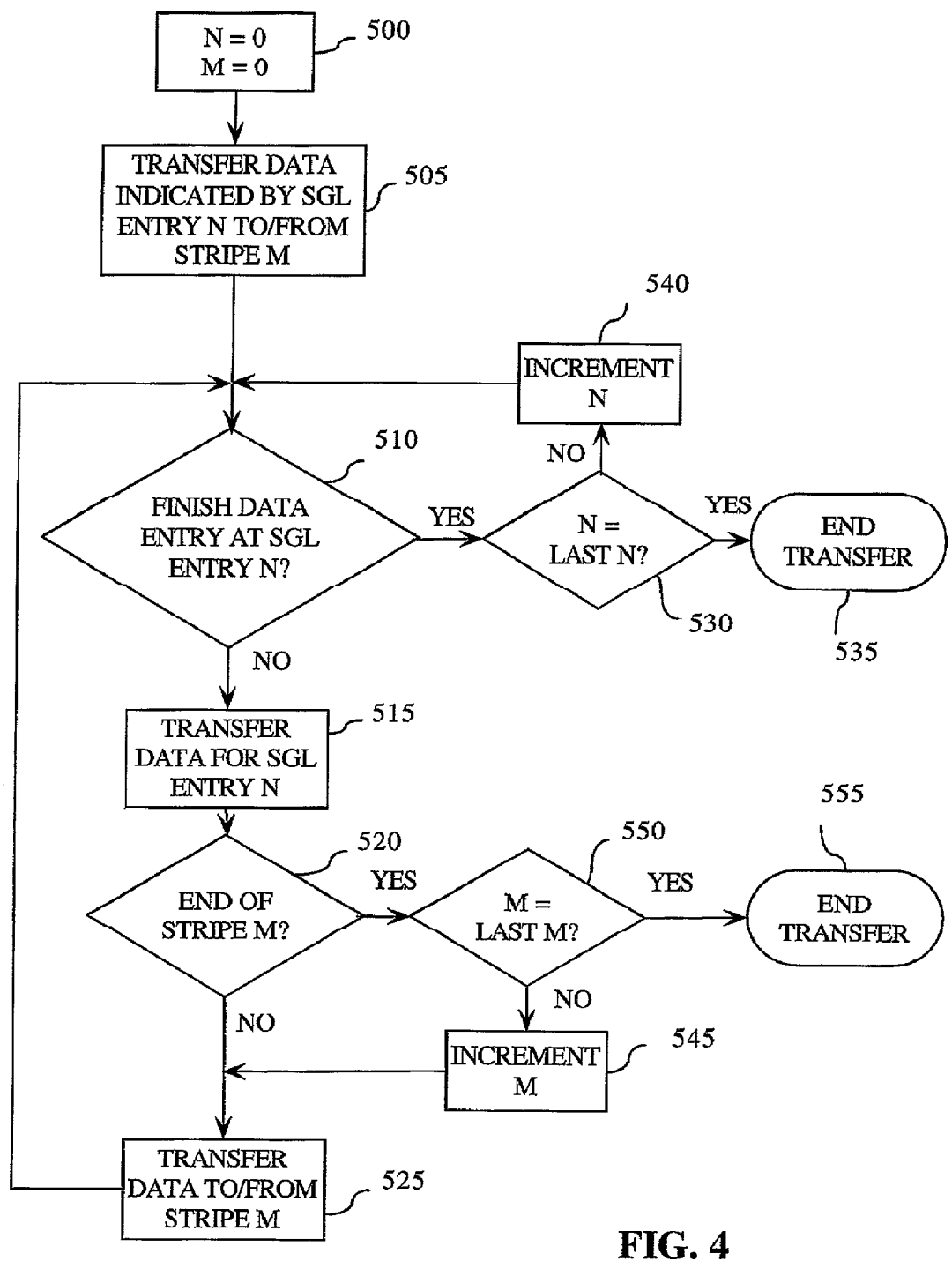
FIG. 4 illustrates an embodiment of the method for fragmented host memory.

FIG. 4 illustrates another embodiment of the present invention. In this embodiment, the data may be very fragmented in host memory. The resulting scatter gather list may be quite large to fully account for the data to be transferred through a host I/O request to accommodate the multiple start addresses and either byte lengths or end addresses which correspond to each data stripe. In the method, the SGL entry number n and stripe number m are initialized, per step 500. Data is transferred according to the SGL entry number n and the stripe number m, per step 505. A determination is made if all the data has been transferred which is referenced by SGL entry n, step 510. If it has not been fully transferred, it is transferred to stripe m, per step 515. Otherwise, a determination is made as to whether the end of the SGL has been reached, per step 530. If the end of the SGL has not been reached and the data defined by the last entry of the SGL has been fully transferred, the next entry in the SGL is accessed, per step 540. Otherwise, transfer for the single host I/O request is ended, per step 535. If data is transferred as defined by SGL entry n, as per step 515, a determination is then made as to whether the end of stripe m has been reached, per step 520. If it has, then another determination is made whether this is the last stripe, step 550. If it is, then transfer for the host I/O request ends, per step 555. Otherwise, the next stripe m is accessed, per step 545. The data is then written to or read from stripe m, per step 525, and processing returns to step 510. Variations of this method are contemplated by the present invention. For example, step 515 may follow step 520 or steps 515 and 525 may be merged into a single transfer step. Data transfer may occur directly between the host device and the disk arrays or it may be temporarily stored within the disk array controller memory. Further, an initial determination may be made after step 500 as to whether there is actually data defined by the SGL, whether the disk drives are full, or whether there is enough space in a data stripe for the data. Also, step 505 may be merged into step 515 and/or step 525.

Figure 5:
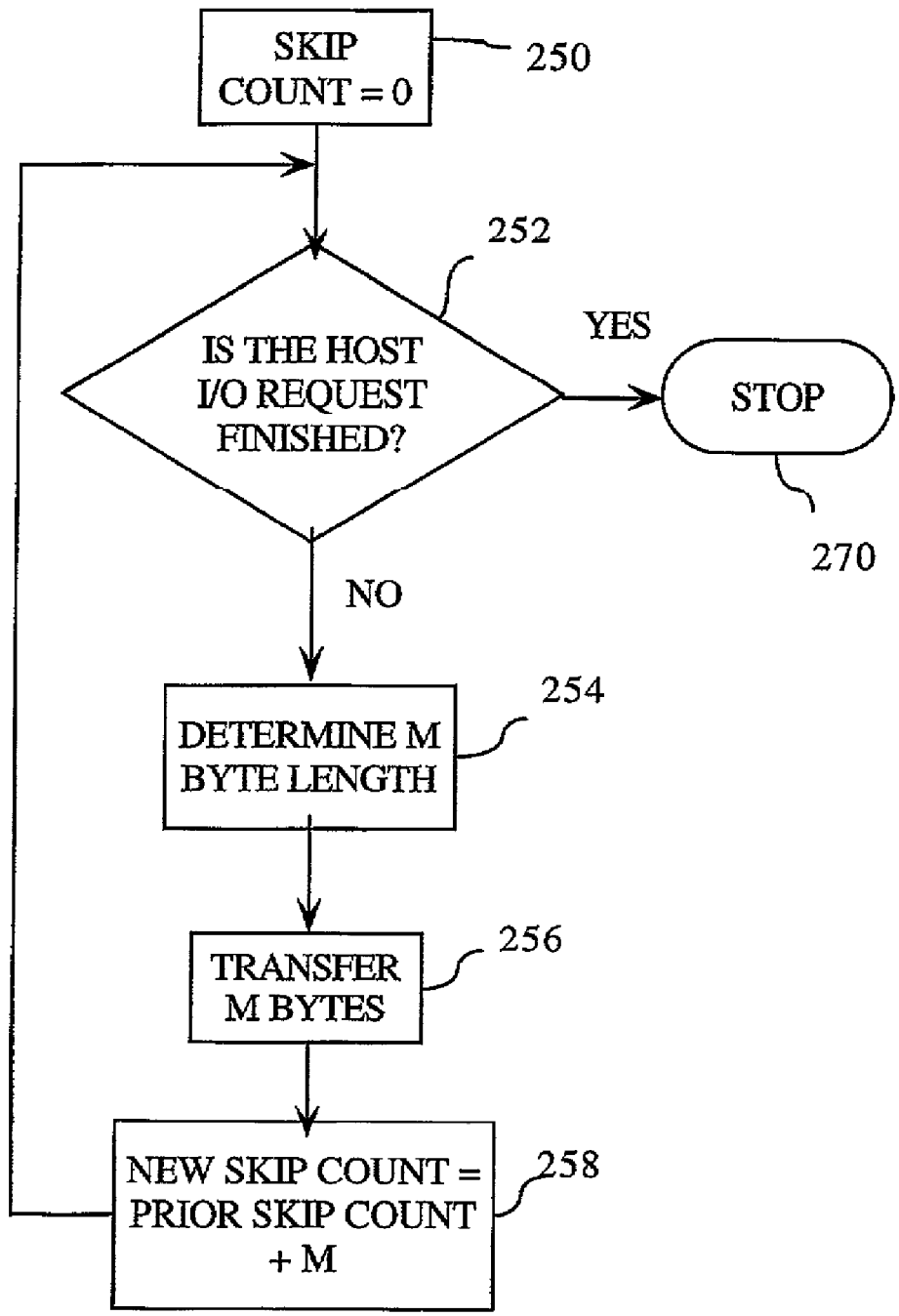
FIG. 5 illustrates the method for generating a skip count.

In another embodiment, a single parameter, SkipCount, is used to traverse the single SGL. FIG. 5 illustrates a method of determining the SkipCount. SkipCount is initialized, step 250. A determination is made as to whether the host I/O request has been fulfilled, step 252. This step may occur later in processing and may include other processing, such as determination of fault states including memory full. If the host I/O request has been fulfilled, the data transfer associated with the request is terminated, step 270. A determination is made of the number of bytes m in associated with the SGL entry, step 254. This may be achieved by being provided in the SGL, as well being determined by counting or other processing. The m bytes are transferred according to the SGL entry parameters, step 256. After the transfer for the SGL entry is finished, the SkipCount is increased by m, for the number of bytes (or word) has been transferred for that SGL entry. The number of bytes may be limited to a small set of sizes, such as 64K, 63.5K, and 0.5K, or may be of a larger size to accommodate greater variation in the number of bytes associated with a given SGL entry.

Figure 6:
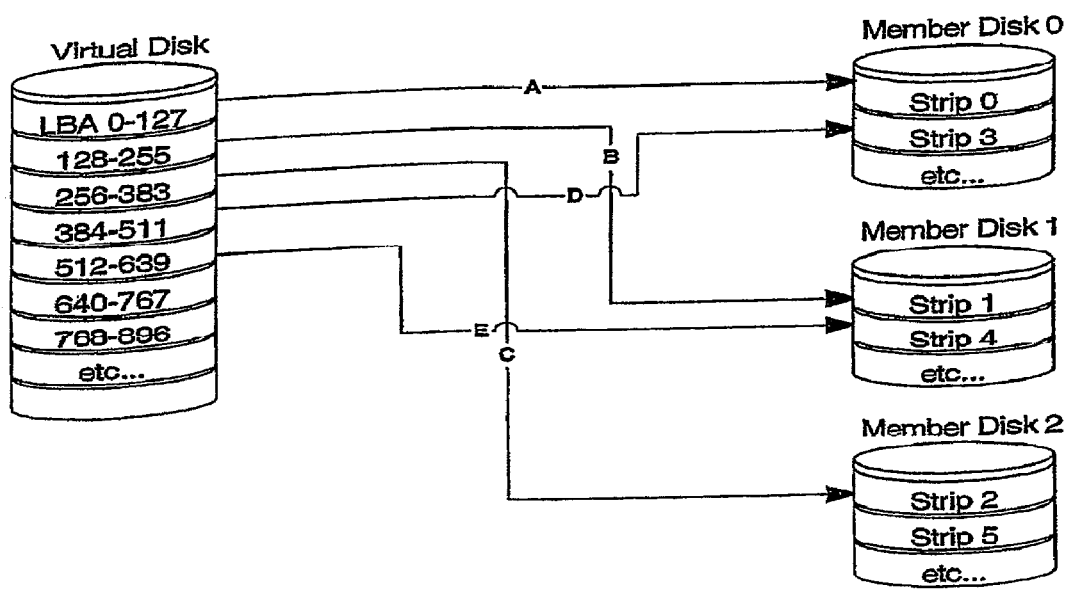
FIG. 6 illustrates a RAID 0 implementation of the present invention.

FIG. 6 illustrates an example of the present invention practiced with a RAID 0 in which a single parameter, SkipCount, is used to traverse the single SGL. In this example, the stripe size is 64K, the number of drives is three, and the block size is 0.5K (512 bytes). The write I/O request is a 256K byte write starting at virtual logical block address (LBA) 1. Five separate I/O requests are generated from the original I/O request to stripe the data across the three physical disks to accommodate four 64K stripes and a block stripe of 0.5K. A single physical I/O request is generated for each physical stripe that is being accessed. The datapath engine may transfer the data according to a data transfer scheme described above. During I/O request A, data stripe 0 is written to member disk 0. During I/O request B, data stripe 1 is written to member disk 1. During I/O request C, data stripe 2 is written to member disk 2. During I/O request D, data stripe 3 is written to member disk 0. During I/O request E, data stripe 4 is written to member disk 1. Table 1 summarizes the mapping operation of data associated with the single host I/O request to the memory locations of the disk drives. Note that there is no redundancy or parity for RAID 0.

TABLE 1

| I/O request | Size | Drive | Starting Virtual LBA | Starting Physical LBA | SkipCount |
|---|---|---|---|---|---|
| A | 63.5 K | 0 | 1 | 1 | 0 |
| B | 64 K | 1 | 128 | 0 | 63.5 K |
| C | 64 K | 2 | 256 | 0 | 127.5 K |
| D | 64 K | 0 | 384 | 128 | 191.5 K |
| E | 0.5 K | 1 | 512 | 128 | 255.5 K |

Figure 7:
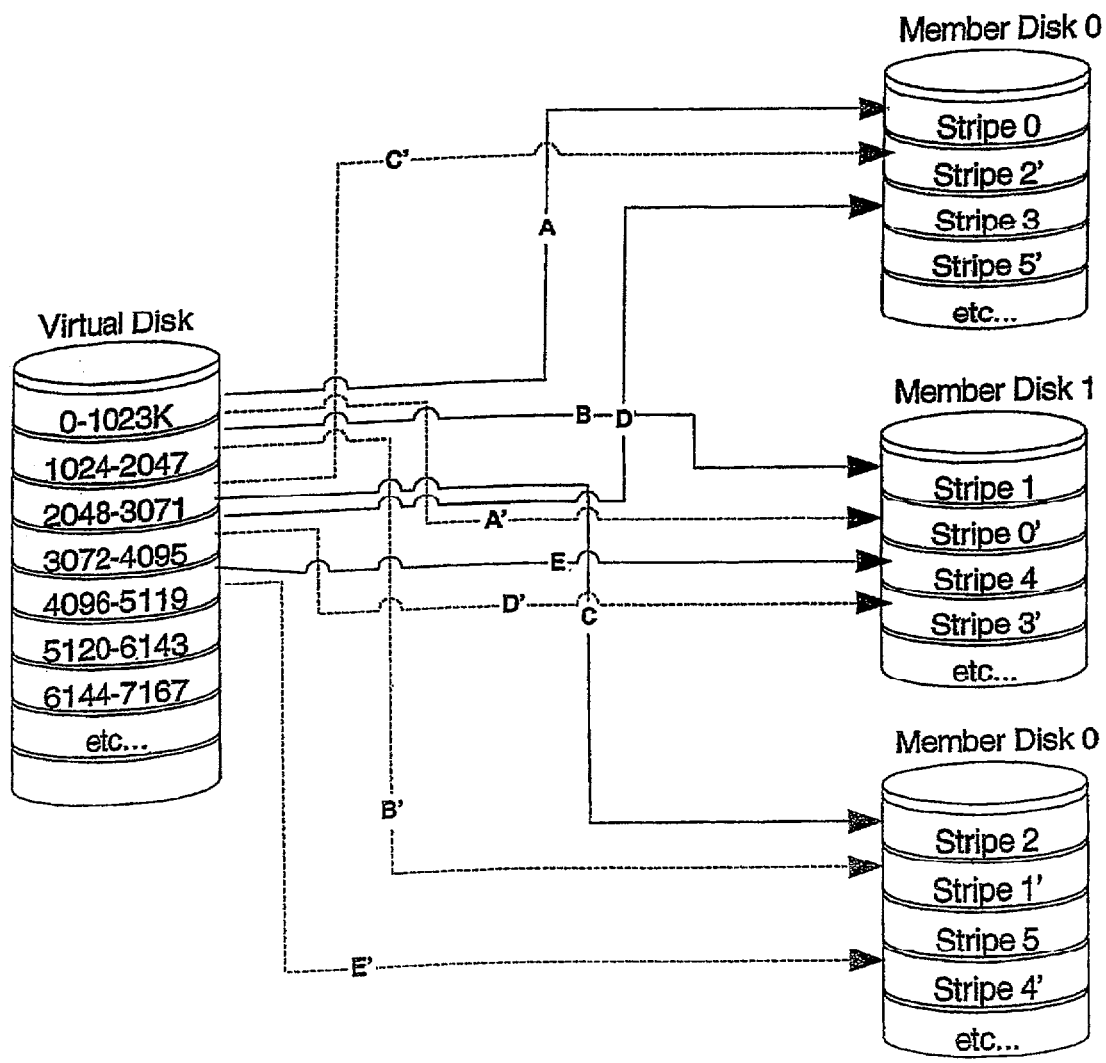
FIG. 7 illustrates a RAID 1E implementation of the present invention.

FIG. 7 illustrates a host I/O request for RAID 1E in which a single parameter, SkipCount, is used to traverse the single SGL. In this example, the stripe size is 1 MB, the number of drives is three, and the block size is 0.5K (512 bytes). A single host I/O request involves the transfer of 4 MB starting at virtual disk LBA 1. Ten I/O requests are generated from the original I/O request to stripe the data across the three physical disks and to mirror it in the associated mirrored stripes. A single I/O request is generated for each physical stripe that is being accessed. The single I/O requests are as follows: in A, data stripe 0 is written to member disk 0; in B, data stripe 1 is written to member disk 1; and in C, data stripe 2 is written to member disk 2. Furthermore, mirrored copies of these data stripes are written, in a staggered fashion to the disk drives. The mirrored I/O requests are as follows: in A', stripe 0' is written to member disk 1; in B', stripes 1' is written to member disk 2; and in C' stripe 2' is written to member disk 0. Next, single I/O requests D, E, F, D', E', and F' are performed in a similar manner. Table 2 summarizes the mapping operation of data associated with the single host I/O request to the memory locations of the disk drives.

TABLE 2

| I/O Request | Size | Drive | Physical Stripe | SkipCount |
|---|---|---|---|---|
| A | 1023.5 K | 0 | 0 | 0 |
| B | 1024 K | 1 | 1 | 1023.5 K |
| C | 1024 K | 2 | 2 | 2047.5 K |
| D | 1024 K | 0 | 3 | 3071.5 K |
| E | 0.5 K | 1 | 4 | 4095.5 K |
| A' | 1023.5 K | 1 | 0' | 0 |
| B' | 1024 K | 2 | 1' | 1023.5 K |
| C' | 1024 K | 0 | 2' | 2047.5 K |

TABLE 2-continued

| I/O Request | Size | Drive | Physical Stripe | SkipCount |
|---|---|---|---|---|
| D' | 1024 K | 1 | 3' | 3071.5 K |
| E' | 0.5 K | 2 | 4' | 4095.5 K |

The present invention is not limited to the embodiments described above. Although the present invention has disclosed data stripe sizes of 64K, 1 MB, and 0.5K, it may be practiced with other data sizes. Generally, stripe size is a power of 2. The data stripe sizes may be 128K, 256K, 512K, or the like. Also, the present invention is not limited to RAID 0 and RAID 1E systems, but may be practiced with other RAID levels, such as RAID 1 and RAID 10, as well as other disk array technology. Each physical I/O request may be created for an entire stripe or a part of a stripe.

It is believed that the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A method for processing an I/O request, comprising steps of:
   receiving an I/O request from a host;
   generating a scatter gather list according to parameters of the I/O request, the scatter gather list including a flag field for providing parameter information, the flag field being different and separate from either a length field or an address field;
   dividing the I/O request from the host into a plurality of physical I/O requests; and
   performing each of the plurality of physical I/O requests in conjunction with the scatter gather list,
   wherein data is transferable to and from a disk array,
   wherein the step of dividina the I/O recjuest is accomplished through parameters including a set of absolute start and absolute end addresses of contiguous memory.

2. The method of claim 1, the disk array forming a redundant array of independent disks (RAID).

3. The method of claim 2, the RAID being in conformance with the specification for RAID 0.

4. The method of claim 2, the RAID being in conformance with the specification for RAID 1E.

5. The method of claim 1, the scatter gather list being traversed to provide data for each of the plurality of physical I/O requests.

6. The method of claim 1, each of the plurality of physical I/O requests corresponding to one of a plurality of data stripes, the plurality of data stripes including at least a data stripe greater than or equal to 64K in size.

7. The method of claim 1, in which the step of dividing the I/O request is accomplished through parameters including a number of bytes of an initial block of data, a number of bytes to skip prior to transferring data, a number of bytes in a single stripe, and an amount of bytes to skip after transferring the stripe of the data.

8. The method of claim 1, the set of absolute start and absolute end addresses define host memory from which the data is transferred to the disk array.

9. The method of claim 1, in which the set of absolute start and absolute end addresses define memory or determine where data is to be stored when transferred from the disk drives to a host memory.

10. The method of claim 1, in which the step of dividing the I/O request is accomplished through a single parameter of an amount of bytes to skip after transferring the stripe of data.

11. A system of data transfer in a redundant array of independent disks (RAID) system, comprising:
   means for generating multiple physical I/O requests from a host I/O request via parameters, the parameters including a set of absolute start and absolute end addresses of contiguous memory;
   means for traversing a scatter gather list, the scatter gather list including a flag field for providing parameter information, the flag field being different and separate from either a length field or an address field; and
   means for transferring data between disk drives of the RAID system and the host using the means for traversing the scatter gather list and the means for generating multiple physical I/O requests in which each of the multiple physical I/O requests results in the transfer of data to or from a data stripe on one of the disk drives.

* * * * *